Feb. 27, 1968     J. J. MEARS, JR., ET AL     3,371,075
NEUTRALIZATION AND DECOLORIZATION OF POLYMERIZED OILS
Original Filed April 27, 1964
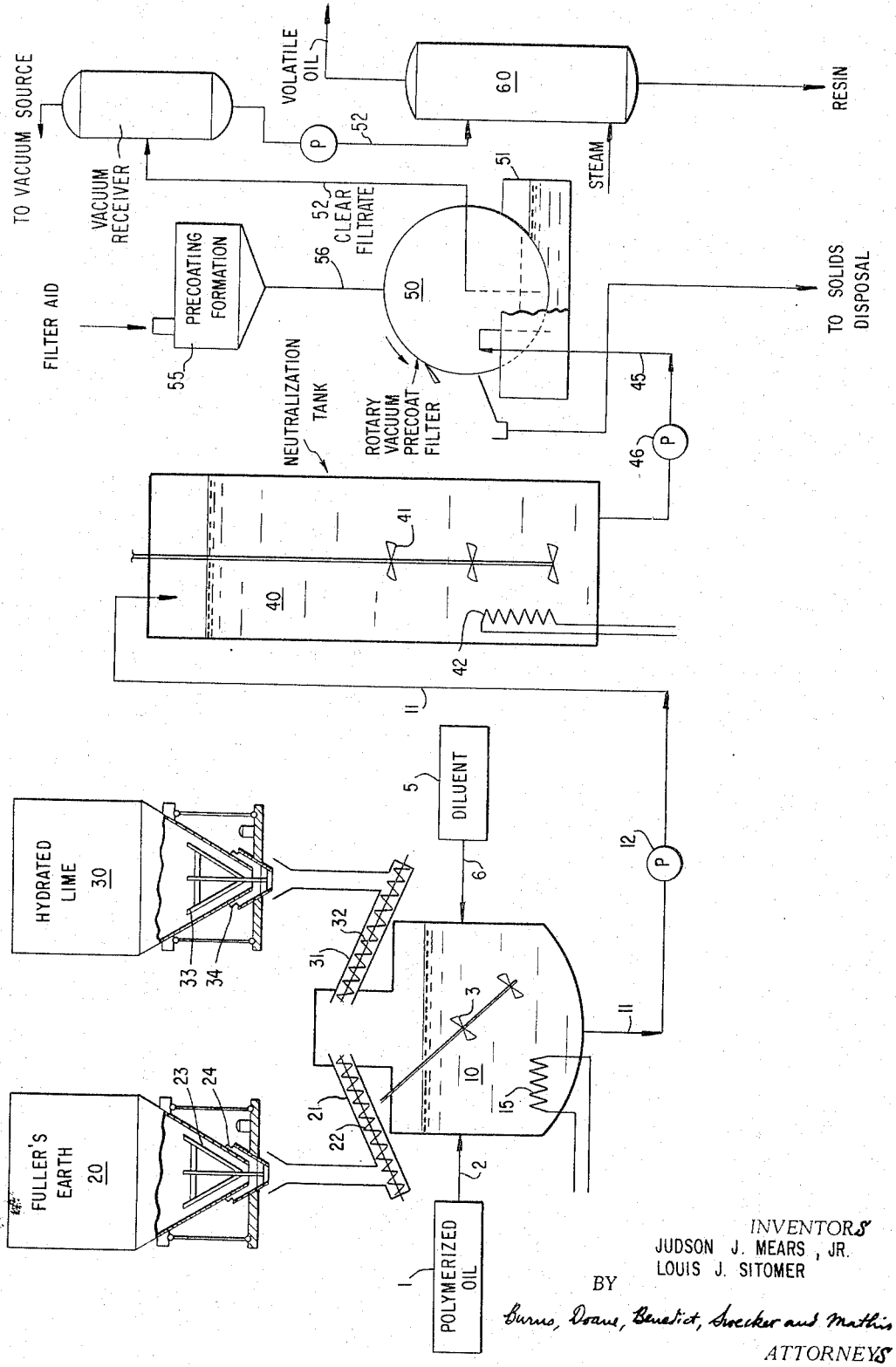
INVENTORS
JUDSON J. MEARS, JR.
LOUIS J. SITOMER
BY *Burns, Doane, Benedict, Swecker and Mathis*
ATTORNEYS

United States Patent Office 3,371,075
Patented Feb. 27, 1968

3,371,075
NEUTRALIZATION AND DECOLORIZATION
OF POLYMERIZED OILS
Judson Joseph Mears, Jr., and Louis Jack Sitomer, Pittsburgh, Pa., assignors to Neville Chemical Company, Pittsburgh, Pa., a corporation of Pennsylvania
Continuation of application Ser. No. 362,671, Apr. 27, 1964. This application Nov. 1, 1966, Ser. No. 591,340
6 Claims. (Cl. 260—82)

ABSTRACT OF THE DISCLOSURE

A resin-containing and sludge-containing hydrocarbon oil obtained by polymerization of a cracked petroleum fraction in the presence of a boron trifluoride catalyst is neutralized and decolorized without intervening separation of sludge by treatment with fuller's earth and hydrated lime at a temperature between about 65° and 110° C. After removal of the fuller's earth and lime by filtration of the mixture, a light-colored resin of low acidity can be produced from the resulting resin-containing filtrate by stripping from it the unpolymerized constituents. The product finds utility as an internal plasticizer for oleoresinous varnishes, light-colored plastic compositions and adhesives.

---

This application is a continuation of Ser. No. 362,671, filed Apr. 27, 1964, and now abandoned.

This invention relates to an improved continuous process for effectively neutralizing and decolorizing polymerized hydrocarbon oils. More particularly, the invention relates to a process for neutralizing and decolorizing resin-containing liquids prepared by polymerization of cracked petroleum fractions employing a boron trifluoride type polymerization catalyst.

The polymerization of unsaturated liquid hydrocarbons by means of boron trifluoride type catalysts generally results in a crude polymer oil which requires decolorization and neutralization or removal of the acidic catalyst residue in order to permit efficient processing of the polymer oil into a commercial product acceptable for high grade uses, e.g., as an internal plasticizer for oleoresinous varnishes, light colored plastic compositions, adhesives and so forth.

In addition to being substantially neutral and non-corrosive, the finished product should also be clear and light in color as such visual properties often represent important product specifications. In order to accomplish this, various solid materials such as KF, NaF, KOH, NaOH, lime, alumina, clay, and the like have been proposed which are capable of selectively absorbing various color bodies or reacting with the $BF_3$ catalyst residue.

However, uniform product quality has been difficult to maintain both in continuous and in batch operations. While relatively good products have been obtained by percolation of the polymerized oils through beds of clay or the like, this required quite large quantities of adsorbent and tended to result in gradual deterioration in product quality with the age of the adsorbent bed.

It is an object of the invention to provide an improved continuous process for effectively removing dark colored and acidic catalyst residues from resin-containing hydrocarbon liquids produced by polymerization of unsaturated hydrocarbon feeds in the presence of catalysts comprising boron trifluoride.

A more particular object of the invention is to provide a continuous process for making light colored and neutralized oils possessing uniform product quality on a more economical basis, without the addition of any liquid treating agents and with a minimum of equipment corrosion, than has hitherto been possible.

A further object is to get lighter color and better nuetralization than have been obtained by conventional procedures.

Other objects of the invention, as well as the nature, scope and advantages of the invention will further appear from the following detailed description. Unless otherwise indicated, all percentages or proportions of materials are stated in this description on a weight basis.

The drawing illustrates a schematic flow diagram of the novel process showing process equipment well suited for carrying out the invention.

It has now been discovered that certain polymer oils obtained by polymerization of unsaturated hydrocarbon fractions employing a boron trifluoride type catalyst may be unusually efficiently neutralized and decolorized by agitating the oils with certain small quantities of a synergistic combination of very finely divided solids comprising attapulgite clay, such as fuller's earth, and hydrated lime while heating and then removing the suspended spent solids from the neutral products.

As stated earlier, lime has been proposed in the prior art for the neutralization of oils polymerized with Friedel-Crafts type catalysts. However, it lacks adequate decolorizing properties to obtain both a neutralized and decolorized product without the use of excessively large quantities. Clays have been found useful to decolorize polymerized oils, but are of limited neutralization value unless used in large quantities. An improved process has now been devised for both the neutralization and decolorization of certain polymerized oils which obtains the desired results at significantly less cost and with greater ease and consistency than any known prior art process was capable of achieving.

The polymerized oils particularly suited for treatment according to the present invention are the oils obtained by polymerization of low pressure distillates ("LPD" resins) or of so-called dripolene streams obtained, as is well known, by thermally cracking natural gas or low boiling liquid petroleum fractions.

The low pressure distillates are unsaturated normally liquid hydrocarbon fractions boiling between 100–275° C. obtained from the high temperature and low pressure pyrolysis of normally liquid or gaseous petroleum cuts which comprise hydrocarbons having two or more carbon atoms per molecule. As is well known, such pyrolysis or thermal cracking may be carried out with or without the addition of steam. The LPD fractions may be by-products of pyrolytic processes in which the principal products sought are low boiling olefins and dienes such as ethylene, propylene, butenes, butadiene, etc. which are widely used feeds in the petrochemical, plastics and elastomer fields.

The dripolene streams contain mono-, bi-, and polycyclic olefins and diolefins from $C_5$ to $C_{14}$ distilling between about 50° C. and 340° C. and have a specific gravity at 15.6/15.6 of between .900 to .980. Present in such feeds as principal polymerizable components in an amount of more than 10%, preferably more than 30%, are dicyclopentadiene alone or more usually in admixture with indene, methyl styrene or several of these compounds. In addition, such feeds generally contain between about 3% and 10% of the dimer of methylcyclopentadiene, the mixed dimer of cyclopentadiene and methylcyclopentadiene, methyl indene, vinyl methyldicycloheptene, dimethylcyclohexadiene, methylcyclohexadiene, or cyclohexadiene, or a mixture of two or more of these compounds. Furthermore, these feeds usually also contain a small amount of methyl bicycloheptadiene, methyl bicycloheptene, bicycloheptadiene, bicycloheptene, dimethylcyclopentadiene, methylcyclopentadiene, cyclopentadiene, isoprene and piperylene, or any of them. In addition to the aforementioned components these feeds also usually contain benzene, toluene, xylene, and higher aromatics containing up to 14 carbon atoms or any of them. The percent resin recoverable from such feeds upon polymerization thereof usually ranges from 30% to 90%. Particularly desirable feeds contain at least 50% of dicyclopentadiene and its homologues.

In the context of the present invention it is important that any such cracked hydrocarbon fraction, before it is subjected to the action of the $BF_3$ polymerization catalyst, be substantially anhydrous, i.e., that its moisture content be reduced to a value not exceeding about 0.03% of $H_2O$. For this reason, the cracked hydrocarbon fraction is desirably contacted with a desiccant such as anhydrous calcium sulfate before it is fed to the polymerization reactor where it is polymerized in a continuous operation. In the polymerization reactor about 0.2 to 1.0% of gaseous boron trifluoride, based on the hydrocarbon feed, is bubbled through the feed at a temperature between about $-20°$ and about $35°$ C. in an otherwise conventional manner. Instead of $BF_3$, equivalent amounts of its liquid or solid complex double compounds such as the complexes of $BF_3$ with a lower dialkyl ether such as dimethyl or diethyl ether, or $BF_3$ carboxylates may be used similarly.

The effluent from the polymerization zone is an oil which is usually reddish purple to black in color and substantially acidic due to its content of sludge-like complexes which the $BF_3$ catalyst forms with unsaturated hydrocarbons. Typically, such freshly polymerized oil may have an acidity of more than 100 ml., e.g., 200 to 300 ml., of 0.1 N KOH per 200 gms. of the oil. For proper after-treatment in accordance with this invention, the moisture content of this polymerized oil should not be allowed to exceed about 0.3%, and should preferably be below 0.1%, as higher concentrations of water tend to have an adverse effect on ultimate product color as well as on the operability of the process since such water tends to form objectionable slime by reaction with the subsequently added treating agents. In some instances such water leads to the formation of hard concrete-like deposits which interfere with the continued effectiveness of the process and are very difficult to remove from the system.

The crude, dark colored and acidic oil from the polymerization reactor typically may contain about 35% to 50% of normally solid or semi-solid resinous polymer dissolved in the unpolymerizable hydrocarbon components of the feed and, to assure maximum effectiveness of the after-treatment, should have a viscosity between about 4 and 10 centipoises at the treating temperature, e.g., at 90° C. When the viscosity of the effluent from the polymerization reactor is higher than desired it can be adjusted by adding to the effluent a suitable amount of an inert hydrocarbon diluent or by raising the treating temperature within the permissible limits set forth below or by a combination of these expedients. Any inert hydrocarbon diluent which is liquid at the treating temperature and can be distilled out of the effluent by heating to a temperature between about 150° and 250° C. may be used. For instance, the unpolymerized components separated from previously processed product can be conveniently employed as diluents for freshly polymerized oil when necessary. This polymerized oil, after adjustment of its viscosity as just indicated, is then mixed with clay and lime for treatment in accordance with this invention as further described below.

Fuller's earth is an activated clay-like material particularly suitable for use in the present invention. It is a commercially available material with high natural adsorptive powers wherein attapulgite $$(Mg, Al)_5Si_8O_{22}(OH)_4 \cdot 4H_2O$$

and montmorillonite, $$AlO_3 \cdot 4SiO_2 \cdot H_2O$$

usually compose more than 90% of the total mineral content. In the case of Florida fuller's earth, which is particularly preferred herein, the mineral content consists principally of attapulgite or floridin, an aluminum magnesium silicate mineral consisting of colloid size crystals needle-like or fibrous in shape. Its activation is accomplished by calcining it at elevated temperature and extruding it in a plastic condition through a die whereby the natural orientation of the aggregated and oriented mineral molecules is disrupted and pore volume is increased prior to final milling. Finely divided fuller's earth of about $-200$ mesh size or finer, i.e., passing through through a 200 mesh sieve (Tyler standard), in a quantity of about 2.0% based on the oil being treated, may satisfactorily be employed as the clay component in the present process.

The second component of the synergistic combination is a commercially available grade of finely divided hydrated lime, $Ca(OH)_2$, preferably of about $-325$ mesh size (Tyler standard). Hydrated lime is commonly produced by slaking lime, $CaO$, with the correct quantity of water to yield a fine and dry powder. A quantity of this component amounting to about 2.0% of the oil being treated has been found satisfactory for carrying out the present invention. While coarser particles of the fuller's earth and lime than indicated may flow more freely and are therefore easier to discharge by gravity from storage bins, the very fine particle size materials indicated above are required in order to produce the required neutralization and decolorization and obtain the full benefit of the present invention. Attempts to use coarser particle sizes or a greater concentration of lime than of clay have required the use of substantially larger amounts of total solids and have resulted in substantially impaired filtration rates.

Referring to the drawing, in the process of this invention the polymerized oil is fed continuously from storage tank 1 by way of conduit 2 into premix tank 10 which is provided with an agitator 3 to insure uniform mixing and good contact between the solids and oil. Next to premix tank 10 is located a pair of hoppers 20 and 30 which contain finely divided supplies of fuller's earth and hydrated lime respectively. The finely divided particles are simultaneously and continuously conveyed from their respective hoppers to premix tank 10 by means of feeders 21 and 31 which are provided with variable speed power driven screw type feed means 22 and 32 adapted to supply the finely divided solids continuously in predetermined measured quantities to tank 10. In order to prevent "hang up" or forming of an arch of the finely divided materials within the hoppers, and to insure a uniform supply of the particles to the feeders 21 and 31, vibrating means 23 and 33 are provided within the lower portion of the hoppers being attached to the lower portion of the bins by means of rubber gaskets 24 and 34 or similar flexible seal. A suitable construction of such a bin vibration device, manufactured by Vibra Screw Feeders, Inc., is described, for instance, in Chemical Week, issue of May 12, 1962. Such a vibrator produces a vibration thrust in excess of 5,000 lbs., e.g., 10,000 lbs. or more. Vibration amplitudes may range up to about ⅛ inch at 1,200 cycles per minute depending on the positioning of the eccentric element.

As the appropriate quantities of polymerized oil, fuller's earth, and hydrated lime are continuously fed to and agitated within premix tank 10, a thin slurry of these components is formed and is continuously withdrawn by means of conduit 11 with the aid of a suitable pump 12. When necessary to obtain the proper viscosity for the oil in tank 10, an appropriate proportion of an inert hydrocarbon diluent such as unpolymerizable distillates, xylol, toluol or naphthas also may be introduced into premix tank 10 from storage tank 5 via line 6.

A steam coil 15 is positioned in premix tank 10 or any other suitable heating means is provided such that the slurry is heated to a temperature of about 55 to 110° C. prior to withdrawal. Upon contact of the polymerized oil with the synergistic combination of fuller's earth and hydrated lime the neutralizaion and decolorization can be considered to commence and may continue until the filtration step described hereafter is complete.

After passing through conduit 11 the slurry is introduced into a relatively larger neutralization and decolorization tank 40 which is provided with an agitator 41. A steam coil 42 or other suitable heating means is provided to maintain a uniform temperature of about 65 to 110° C. in this vessel. The slurry is maintained at this elevated temperature for an average residence time of at least 15 minutes and preferably from about 15 to 60 minutes prior to withdrawal.

From the neutralization and decolorization tank 40 the slurry is continuously fed to a conventional rotary vacuum precoat filter 50 by means of conduit 45 with the aid of pump 40. The rotary drum of the filter 50 is precoated to a depth of approximately three inches with a layer of a slurry formed at 55 from a filter aid such as microporous diatomaceous earth in the same kind of solvent as described earlier herein and conveyed to the filter by means of conduit 56. It is essential that the filter aid selected by chemically inert to polymerized oil and diluent. While the present process is considered to be basically a continuous one, it is understood that an occasional intermittent change of the precoat will be necessary which requires temporary cessation of the process or the alternating use of two filters connected in parallel. Interruption of the process to apply a fresh filter coating does not, however, seriously mitigate against the important advantages gained from the present process. It has in fact been found that if properly applied a single precoating on a precoat filter may provide effective filtration for a period of 6 to 10 days in the present process. During operation the drum of the vacuum filter 50 is rotated through a pan 51 containing the solids-containing polymerized oil slurry and a vacuum is applied within the drum. As the drum rotates the vacuum picks up the slurry and leaves a cake of spent fuller's earth and lime deposited upon the precoat while allowing only the sparkling clear polymerized oil filtrate, straw to amber in color, to pass through the precoat and be withdrawn by means of conduit 52. The acidity of this filtrate is less than 0.75 ml. 0.1N/KOH per 200 gms. of oil. A conventional scraper blade is provided which continuously shaves off the deposited clay and hydrated lime as well as a slight layer of the precoat sufficient to leave a fresh filter surface, the removed solids being conveyed to a solids disposal station in any convenient manner.

Finally, the clear liquid filtrate is passed via conduit 52 to tower 60 where unpolymerized constituents are removed by stripping with steam, maintaining a pot temperature of about 240° C. at the bottom of the tower. The stripped resin, which is liquid at this temperature, is then withdrawn as a bottom stream and sent to conventional finishing operations, e.g., flaking and packaging.

Table I illustrates the advantages which are obtained when a combination of Florida fuller's earth and hydrated lime is employed to neutralize and decolorize a polymerized hydrocarbon oil in accordance with this invention.

The colors reported in this table were determined on the clear filtrate by the Neville Meter Color Method. This method uses the color standards of the Barrett Color Method as described in "Tar Acid Testing Methods," published by the Barrett Division, Allied Chemical and Dye Company, New York, 1946, an electrometric adaptation employing percent light transmission being used and calibrated for conversion to nearest 0.1 of the standard colors. The acidity of the filtrate was determined by titration of a 200-gram sample with 0.1 normal KOH solution.

TABLE I.—TREATMENT OF $BF_3$ POLYMERIZED LPD WITH SOLIDS FOR 15 MINUTES AT 110° C.

| Run No. | Added Solids | Color, Meter | Acidity, ml. 0.1 KOH |
|---|---|---|---|
| 1 | Hydrated lime, 2% and fuller's earth [1] 2%. | 3.0 | 0.6 |
| 2 | Hydrated lime, 2% and fuller's earth [1] 1%. | 3.1 | 0.9 |
| 3 | Hydrated lime, 3% | 3.1 | 1.0 |
| 4 | Hydrated lime, 2% | 3.4 | 0.9 |
| 5 | Quick lime, 3% | 3.4 | 0.9 |
| 6 | Utah clay, 7.5% | 3.8 | 0.9 |
| 7 | Fuller's earth,[1] 7.5% | 3.1 | 0.6 |
| 8 | Tower effluent [2] | 3.2 | 1.8 |

[1] Florex XXX (Size 90% through 200 mesh; Analysis: $SiO_2$ 55–59%, $Al_2O_3$ 12–16%, $Fe_2O_3$ 3–5%, FeO 0.2–0.3%, CaO 1–2%, MgO 2–7%, $Na_2O$ 0.1–0.3%, $K_2O$ 0.5–0.7%, Loss on heating 10–18%, Pore Volume 0.541 cc./gm., Surface Area 120–150 m.²/gm. BET, e.g., 128 m.²/gm. BET).
[2] After percolation through tower packed with clay, color and acidity of effluent oil were measured.

The tabulated data clearly demonstrate the synergistic effect and the resulting superior effectiveness of the combined use of 2% clay and 2% lime in accordance with the present invention (Run 1) as compared with the use of either clay or lime separately (Runs 3–7). It is apparent that either component alone, even when used in substantially higher concentrations than 2%, is significantly less effective in neutralizing power and also gives a darker product. Moreover, lime alone becomes impractical to handle in the process over extended periods because of its tendency to form a concrete-like deposit, presumably by a mechanism involving the formation of calcium carbonate by reaction with atmospheric carbon dioxide. Furthermore, it was quite surprising to find that 2% lime in conjunction with 1% clay (Run 2) gives a product acidity 50% greater than when the same amount of lime is used in conjunction with 2% clay (Run 1). Despite its relatively low absolute value, this difference in acidity is of course of far reaching importance not only in terms of product specifications but especially in terms of process economy in that residual acidity of the oil is a major cause of equipment corrosion. In this connection it is particularly noteworthy that the oil obtained by conventional percolation through a clay tower (Run 8) actually had three times as much acidity as the oil treated in accordance with the present invention.

The scope of the present invention is particularly pointed out in the appended claims.

What is claimed is:

1. An improved continuous process for the neutralization and decolorization of a resin-containing and sludge-containing polymerized hydrocarbon oil having an acidity equivalent to more than 100 ml. of 0.1 N KOH per 200 gms. of the oil and a moisture content below 0.1%, said sludge being in the polymerized oil as a result of the oil having been prepared by polymerizing a substantially anhydrous cracked petroleum fraction which contains at least 10% of $C_5$ to $C_{14}$ olefins and diolefins and distills between about 50° and 340° C. by contact with a boron trifluoride catalyst in a polymerization zone, the improvement which consists essentially in adding to said resin-containing and sludge-containing polymerized oil produced in the polymerization zone without intervening separation of the sludge, about 2% each of fuller's earth having a particle size of about −200 mesh and of hydrated lime having a particle size of about −325 mesh in a substantially dry state from separate storage zones with the aid of vibrating action, adjusting the viscosity of the polymerized oil to give a value of between about 4 and 10 centipoises at a preselected treating temperature by addition thereto of an inert hydrocarbon diluent, said temperature being in the range between about 65° and 110° C., agitating said slurry at said preselected treating temperature for an average period of about 15 to 60 minutes.

and filtering said slurry to separate the dispersed clay and lime particles therefrom and produce a clear, decolorized filtrate having an acidity of less than 0.75 ml. of 0.1 N KOH per 200 gms. of filtrate.

2. A process according to claim 1 wherein said cracked petroleum fraction is a thermally cracked liquid petroleum distillate having a boiling range between about 100° and 275° C.

3. A process according to claim 2 wherein said cracked petroleum fraction is polymerized in the presence of about 0.2% to 10% of boron trifluoride catalyst at a temperature between about −20° and 35° C.

4. A process according to claim 2 wherein an inert hydrocarbon diluent boiling in the same range as said cracked petroleum fraction is added to the polymerized oil to adjust its viscosity to a value between 4 and 10 centipoises at the treating temperature.

5. In a process for the production of light-colored hydrocarbon resin wherein a substantially anhydrous cracked petroleum fraction which contains from about 10% to 70% of $C_5$ to $C_{14}$ olefins and diolefins and distills between 100° and 275° C. is contacted with 0.2% to 1% boron trifluoride in a polymerization zone at a temperature between −20° and 35° C., thereby producing a substantially anhydrous resin-containing polymerized oil which contains a substantial volume of sludge as a result of the formation of complexes between the boron trifluoride and unsaturated hydrocarbons and which has a moisture content below 0.1% and an acidity which is equivalent to more than 100 ml. of 0.1 N KOH per 200 gms. of oil, the improvement which consists essentially in withdrawing the sludge-containing polymerized oil from said polymerization zone, introducing said sludge-containing polymerized oil continuously into a premixing zone, heating said sludge-containing polymerized oil to a premix temperature between 55° and 110° C. and adding thereto without intervening separation of sludge an inert liquid hydrocarbon boiling in the same range as the unpolymerized constituents of said oil to adjust the viscosity of the oil to a value between 4 and 10 centipoises at said premix temperature, steadily adding to said sludge-containing polymerized oil in said premixing zone about 2% each of powdered fuller's earth having a particle size of −200 mesh and of powdered hydrated lime having a particle size of −325 mesh from separate storage zones with the aid of vibrating action, transferring the resulting slurry of oil, fuller's earth and lime to a neutralization zone, agitating said slurry at a treating temperature between 65° and 110° C. for an average residence time of from 15 to 60 minutes, filtering the resulting treated slurry to produce therefrom a clear resin-containing filtrate having an acidity of less than 0.75 ml. of 0.1 N KOH per 200 gms. of oil, and distilling unpolymerized constituents from said filtrate to produce a light-colored resin therefrom.

6. A process according to claim 5 wherein the fuller's earth is characterized by a surface area of between 120 and 150 m.$^2$/g. and a pore volume greater than 0.5 cc./gm.

References Cited

UNITED STATES PATENTS

| | | | |
|---|---|---|---|
| 2,303,077 | 11/1942 | Giraitis | 208—283 |
| 2,328,707 | 9/1943 | Clar et al. | 260—82 |
| 2,420,108 | 5/1947 | Stratford et al. | 208—283 |
| 2,734,046 | 2/1956 | Nelson et al. | 260—82 |

DELBERT E. GANTZ, *Primary Examiner.*

G. J. CRASANAKIS, *Assistant Examiner.*